UNITED STATES PATENT OFFICE.

ADOLPH OTT, OF NEW YORK, N. Y.

IMPROVED COMPOSITION FOR COVERING STEAM-BOILERS AND LINING SAFES.

Specification forming part of Letters Patent No. 88,661, dated April 6, 1869.

*To all whom it may concern:*

Be it known that I, ADOLPH OTT, of New York, in the county and State of New York, have invented a new and useful Covering for Steam-Boilers and Lining Safes, which I designate as "Non-Conductive Flint Conglomerate;" and I hereby declare that the following is a full and exact description thereof.

To enable others skilled in the art to make and use my invention, I will proceed to describe it.

I take forty pounds of fibrous gypsum, mica or gneiss slate, or amphibolite of the fibrous variety; seventy-five pounds of quartz-sand, quartzose slate, or itacolumite; seventy-five pounds of concentrated lye of commerce; forty pounds of a talcose silicate, such as talcose mica, talc, saponite, steatite, talcite, or any mineral belonging to the class of the serpentine; ten parts of powdered leather, fine sawdust, cotton, or wool shoddy; and ten parts of Roman cement. I mix these materials thoroughly, and expose them, in a glass pot, to a white heat, until the desired combination has taken place, and I dilute the resulting compound with water; or I introduce in the mixture of the above materials, with the exception of the concentrated lye, the quartz-sand, quartzose slate, or itacolumite, as much of silicate of soda, of from 25° to 50° Baumé, as to form a plastic mass, and apply the same, with a trowel or other instrument, to the surface to be covered. It will then become dry and hard.

The many advantages of this compound over others patented for the same purpose may be condensed in the following: It is composed of perfect non-conductors of heat; it consists of materials which possess a great solidifying power—some of them contain water of crystallization; it adheres with great firmness to any surface upon which it may be applied; being tenacious, it neither cracks nor blisters; it can be spread like plaster-of-paris; it neither hardens too quick nor too slow; and, finally, it is very inexpensive.

I disclaim in my invention metallic substances, such as litharge or emery-powder, which allow heat to pass freely through them, or costly vegetable fibers, such as paper-pulp or flax fiber. I also do not claim a greater quantity of quartz-sand, quartzose slate, or itacolumite than would enter into chemical combination; and I do not confine myself to the proportions given above; but

What I claim as my invention, and desire to secure by Letters Patent, is—

The compound consisting of the above materials, in any desirable proportion, substantially as herein described, and for the uses and purposes set forth.

ADOLPH OTT.

Witnesses:
  D. T. GARDNER,
  J. C. THORN.